June 14, 1960     R. P. BOYER, JR     2,941,194
INDICATOR FOR TELEPHONE SYSTEMS
Filed April 1, 1957
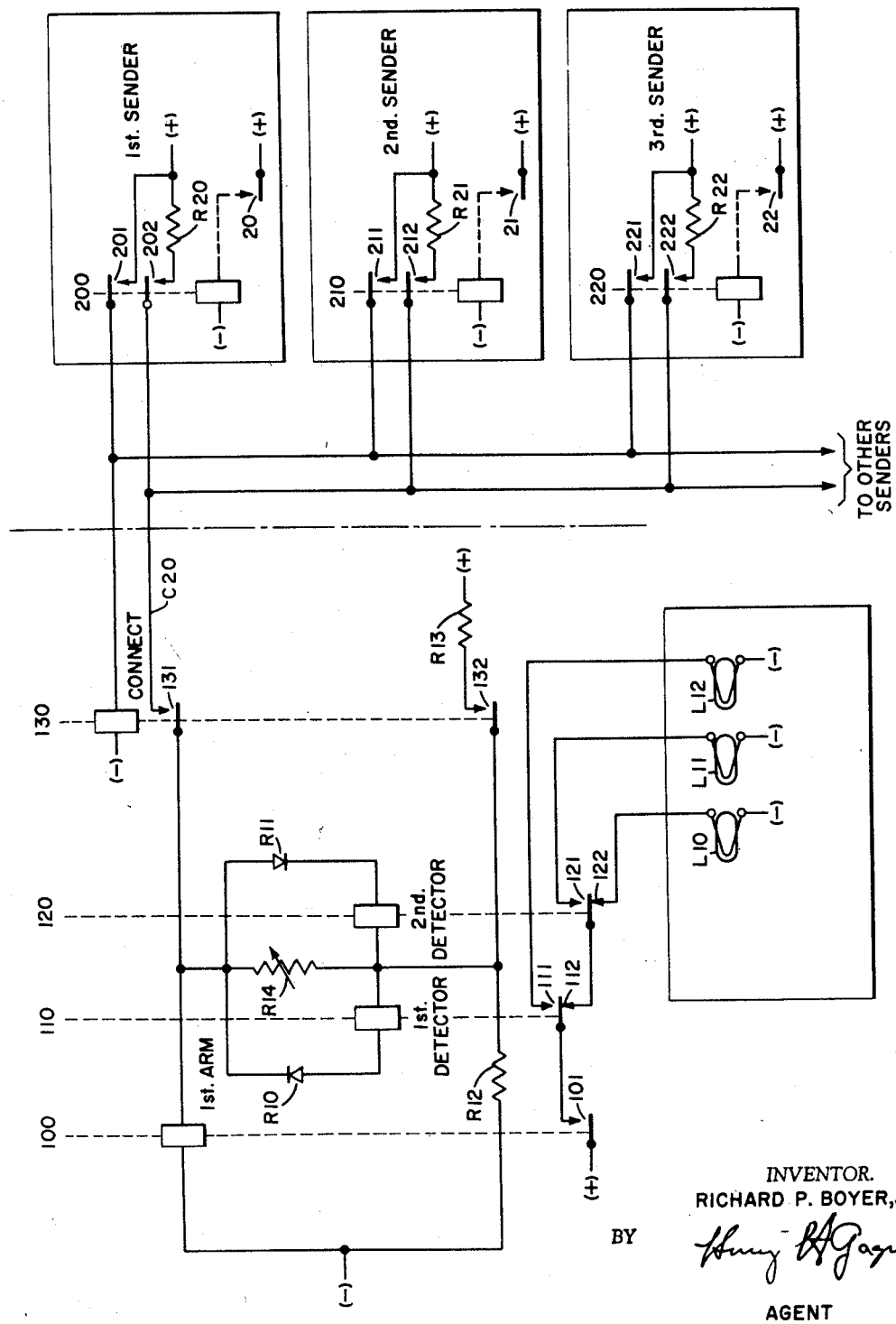
INVENTOR.
RICHARD P. BOYER, JR.
BY
AGENT

United States Patent Office

2,941,194
Patented June 14, 1960

2,941,194

INDICATOR FOR TELEPHONE SYSTEMS

Richard P. Boyer, Jr., Rochester, N.Y., assignor to General Dynamics Corporation, Rochester, N.Y., a corporation of Delaware Filed Apr. 1, 1957, Ser. No. 649,964

2 Claims. (Cl. 340—248)

My invention relates to condition indicating systems in general and more particularly to systems for indicating the number of telephone circuits having a particular condition imposed thereon at any particular time.

In telephone systems there may be provided a plurality of circuits, such as well known digit senders, having means for storing data within any or all the circuits until apparatus for using or transmitting the data becomes available. In such systems, it is advantageous to be able to determine at any particular time the number of circuits in which unused or untransmitted data is stored in order to make easier such tasks as making traffic measurements and recognizing overload or alarm conditions.

Accordingly, it is an object of my invention to provide a new and improved indicator system.

Another object of my invention is to provide a new and improved indicator system employing a bridge.

Another object of my invention is to provide a new and improved indicating bridge circuit.

Another object of my invention is to provide a new and improved detector for use with an indicating bridge circuit.

I accomplish these and other objects in the manner set forth in the following description of the preferred embodiment of my invention.

In the description, reference is made to the following drawings affixed to and forming a part of the present specification, and in which:

The figure shows a schematic diagram of an indicating bridge circuit and a skeletonized form of a plurality of register sender circuits.

Power for the apparatus set forth in the description is drawn from a potential source such as a battery, the most positive plate or terminal of which is connected to ground. The most positive plate is hereinafter referred to in the description as "ground" and in the drawings as (+). The most negative, ungrounded plate of the battery is hereinafter referred to as "battery" and in the drawings as (—).

Referring to the single figure, the contemplated system may be used for indicating the number of calls stored in any or all of substantially identical sender circuits, such as the ones indicated first sender, second sender and third sender. Accordingly, each sender is equipped with means (not shown) operative for storing digital information prior to the transmission or spilling of such information into other means (also not shown) such as a trunk circuit over which the data is to be transmitted. Each circuit's storing means is also effective in its operated condition for operating means such as contacts 20, 21 and 22, each of the latter also being individual to each sender. Each of the contacts 20, 21 and 22 in operated condition is effective for completing an obvious operating circuit for the appropriate one of indicator relays 200, 210 and 220, where each relay is individual to the corresponding one of the senders.

Each indicator relay in operated condition is effective for completing an obvious operating circuit for connect relay 130 at make contacts 201, 211 or 221, relay 130 being common to all the sender circuits. Thus it can be seen that relay 130 is operated when any one of the senders has been placed in condition to store untransmitted data.

Referring to the left hand side of the figure, in order to indicate how many of the senders are unavailable owing to the fact that they are storing untransmitted data, I have provided an indicating bridge circuit including three arms of known impedance; the first, second and third arms being the winding of relay 100, resistor R12 and resistor R13, respectively. These known impedance arms are arranged to form the first, second and third arms of a conventional Wheatstone configuration and have connections extending to points (i.e., conductor C20 and ground) to which a fourth, unknown arm may be connected. The potential source is connected across a first diagonal of the bridge from resistor R13 to the junction between the winding of relay 100 and resistor R12. Within the bridge circuit means comprising relays 110 and 120 for detecting voltage differences, in the manner to be described presently, is connected across the other bridge diagonal.

I have provided normally open contacts 132 and 131 in series with the third arm and the unknown arm, respectively. The contacts on relay 130 therefore effectively comprise means for interconnecting the bridge elements to each other and for connecting the potential source across the aforementioned first bridge diagonal. With this arrangement, when none of the senders is storing information and relay 130 is in its normally released condition, the flow of current from the source through the bridge including the detecting means is prevented.

Returning to the consideration of the individual senders, the operation of any one of the sender indicator relays, such as 200, is effective for connecting substantially identical impedance elements, such as resistors R20, R21 and R22, across the above noted connecting points for the fourth arm of the bridge. For instance, when only the first sender is storing untransmitted information, resistor R20 is connected between ground and conductor C20. In this manner as many of the individual circuit impedance elements are connected in the fourth bridge arm as there are sender circuits in condition to store data. Therefore, the resistance of the fourth, unknown bridge arm varies inversely as the number of senders storing information. The impedance ratio between the first, second and third arms of the bridge is chosen so that the bridge is unbalanced in a first direction, balanced, and unbalanced in the opposite direction when a first, a second and a third particular numbers, respectively, of individual sender impedances are connected in the above described manner to the bridge.

In order to determine the condition of the bridge, the aforementioned detecting means including relays 110 and 120 is provided. The detecting means has a network comprising a first path including the winding of relay 110 and unidirectionally conducting means, such as rectifier R10, and a second path including the winding of relay 120 and a second oppositely poled unidirectionally conducting means, such as rectifier R11. The first and second paths are connected in parallel to each other. The detecting means is a part of a potential detecting device including shunt means such as variable resistor R14 connected in parallel with both paths for purposes to be described presently. The detecting means, connected in the previously described manner across the other diagonal of the bridge, is effective when the bridge is unbalanced in the above referred to first direction (i.e., when the point to which the upper end is more negative than the lower end). The potential difference under the conditions described causes current flow over the certain minimum value required to operate relay 110. At this time the flow of current through the second path is blocked by the presence of rectifier R11, so that relay 120 does not operate.

When the bridge is in balance (i.e., when there is no potential difference between the points to which the upper and lower ends of the detecting means are connected), current flowing through either path of the detecting circuit is insufficient to operate either relays 110 or 120. When the bridge is unbalanced in the above referred to opposite direction (the upper end of the bridge is less negative than the lower end), rectifier R11 is conductive, current flow through the second path is above the certain minimum value required to operate relay 120. At this time rectifier R10 prevents the passage of current through the first path so that relay 110 does not operate.

In order to visually indicate the condition of the bridge, I have provided a plurality of devices or means such as lamps L10, L11 and L12. The detecting relays 110 and 120 include contacts 111—112 and 121—122, respectively, for selectively controlling the energization of the indicating means. While I show indicating lamps in the preferred embodiment of my invention, it will be understood by those skilled in the art that other apparatus, including nonvisual devices can be substituted for the lamps without invention.

Before describing the operation of the selective energizing means, it is pointed out that the selective energizing means is normally made ineffective by placing normally open contacts 101 of relay 100 in series with the energizing circuits of the lamps. Thus, when no current is flowing through any bridge arm including the first (i.e., when relay 130 and all the individual sender relays are in normal condition), the circuit for energizing the indicating lamp circuit is deenergized. When current flows through the winding of relay 100 upon the operation of relay 130 and any one of the individual sender relays, relay 100 operates to make the detecting means effective by completing the lamp energizing circuit.

With relay 100 operated and the bridge in the first unbalanced condition (i.e., with relay 110 only operated), a circuit for energizing lamp L12 is completed from ground through make contacts 101 and 111 and lamp L12 to battery. When the bridge is in balanced condition (i.e., with neither relay 110 nor 120 operated), a circuit is completed for energizing lamp L10 from ground through make contacts 101, break contacts 112 and 122, and lamp L10 to battery. When the bridge is unbalanced in the opposite direction (i.e., with only relay 120 operated), a circuit is completed for energizing lamp L11 from ground through make contacts 101, break contacts 112, make contacts 121, and lamp L11 to battery.

In practice, it may be desirable to make possible changes in the above mentioned first and third predetermined numbers of calls through the senders necessary to bring about the unbalanced conditions in the bridge. Accordingly, I have provided the above described shunt means in parallel with the detecting means for regulating the sensitivity of the detecting means. The presence of the shunt means causes the current flowing through the detecting means to be divided between the shunt and the conducting one of the detecting means paths. By changing the value of variable resistor R14, the ratio of current flowing in resistor R14 to the ratio flowing in the conducting path may be changed to the point where the number of resistors, such as R20, R21 and R22, present in the fourth arm of the bridge required to create a potential difference across the other diagonal sufficient to operate the appropriate one of relays 110 and 120 may be changed.

While I have shown and described in the preferred embodiment of my invention a Wheatstone bridge, it is to be understood by those skilled in the art that I do not necessarily wish to limit my invention to the Wheatstone configuration or to make the bridge operative from a direct current potential source. Accordingly, while I have shown and described the preferred embodiment of my invention, other modifications will occur to those skilled in the art. I, therefore, aim in the appended claims to cover all such changes and modifications as fall within the true spirit and scope of my invention.

What is claimed is:

1. In combination, first, second, and third circuits, means for operating each of said circuits, a bridge comprising first, second, and third fixed impedance arms, means for varying the impedance of the fourth arm of said bridge in steps of a value less than, a value substantially equal to, and a value greater than the impedance of said first arm in accordance with the number of circuits operated, a source of potential having first and second terminals, means responsive to the operation of any one of said circuits for connecting the second and third arms of said bridge in series and for connecting the first and fourth arms of said bridge in series between the first and second terminals of said source of potential, first and second detector devices, means for connecting said first and second detector devices in parallel between the junction point of the first and fourth arms of said bridge and the junction point of the second and third arms of said bridge, said first detector device operative in response to current flow of a certain minimum value from the junction point of the first and fourth arms of said bridge to the junction point of the second and third arms of said bridge, said second detector device operative in response to current flow of a certain minimum value from the junction point of the second and third arms of said bridge to the junction point of the first and fourth arms of said bridge, first, second, and third indicating devices, means for operating said first indicating device when at least one of said circuits is operated and neither of said first and second detector devices is operated, means for operating said second indicating device when said first detector device is operated, and means for operating said third indicating device when said second detector device is operated.

2. The combination of claim 1 in which each of said first and second detector devices comprises a relay having an operating winding connected in series with a unidirectional conducting device between the junction point of the first and fourth arms and the junction point of the second and third arms of said bridge.

References Cited in the file of this patent
UNITED STATES PATENTS

| | | |
|---|---|---|
| 1,512,288 | Howe | Oct. 21, 1924 |
| 2,102,141 | Wagar | Dec. 14, 1937 |
| 2,226,952 | Smethurst | Dec. 31, 1940 |
| 2,498,103 | Wojciechowski | Feb. 21, 1950 |
| 2,737,614 | Bonomi | Mar. 6, 1956 |